United States Patent [19]
Kawawaki

[11] Patent Number: 5,335,193
[45] Date of Patent: Aug. 2, 1994

[54] SCIENTIFIC CALCULATOR WITH COORDINATE TRANSFORMATION AND SINGLE LINE NUMERIC VALUE DISPLAY

[75] Inventor: Fumiaki Kawawaki, Shiki, Japan

[73] Assignee: Sharp Kabushiki Kaisha, Osaka, Japan

[21] Appl. No.: 8,328

[22] Filed: Jan. 25, 1993

[30] Foreign Application Priority Data

Jan. 27, 1992 [JP] Japan .................................. 4-12273

[51] Int. Cl.⁵ ............................................... G06F 3/00
[52] U.S. Cl. ........................... 364/709.12; 364/710.11
[58] Field of Search ...................... 364/709.12, 709.01, 364/706, 710.07, 710.11, 710.01

[56] References Cited

U.S. PATENT DOCUMENTS 4,511,987  4/1985  Caldwell et al. ................ 364/709.12
5,175,700  12/1992  Vogel et al. ..................... 364/710.11

FOREIGN PATENT DOCUMENTS

60-186928  4/1985  Japan .

Primary Examiner—Long T. Nguyen
Attorney, Agent, or Firm—Nixon & Vanderhye

[57] ABSTRACT

A scientific calculator capable of function calculation including: an input device for entering a numerical value and a functional formula; a calculation device for calculating two calculation result values based on the numerical value and the functional formula; a storage device for storing the numerical value entered and the calculation result values; a numerical value display unit for displaying one numerical value or one calculation result value; a guidance display unit for displaying a character and a symbol representing a calculation process and the meaning of the numerical value; a symbol display unit for displaying two types of display symbols indicating that, upon display of one of two calculation result values at the numerical value display unit, the other calculation result value is stored in the storage device; and retrieval device for retrieving, upon display of one of .the two types of display symbols, the other numerical value or the calculation result value from the storage device in response to the replacing command, thereby replacing the numerical value or the calculation result value thus retrieved from the storage device with the numerical value or the calculation result value displayed at the moment on the numerical value display units.

4 Claims, 10 Drawing Sheets

| Item | Key operation | Display unit | | Remark |
|---|---|---|---|---|
| | | Guidance Unit | Numerical value display unit | |
| 1 | [ON/C] | | 0. | Clear calculation result |
| 2 | 1 | | 1. | Input X coordinate value |
| 3 | [,] | , | 0. | Input separation code for X and Y |
| 4 | 2 | , | 2. | Input Y coordinate value |
| 5 | [→rθ] | r | 2.2360679977→ | Transform rectangular coordinates into polar coodinates, and display calculation result value "r" |
| 6 | [→] | θ | →63.434948882 | Display calculation result value "θ" |
| 7 | [→] | r | 2.2360679977→ | Display again calculation result value "r" |
| 8 | [2ndf] [→xy] | x | 1.→ | Transform polar coordinates into rectangular coordinates, and display calculation result value "X" |
| 9 | [→] | y | →2. | Display Y coordinate value |

| Item | Key operation | Display | Remark |
|------|---------------|---------|--------|
| 1 | [ON/C] | 0. | Clear calculation result |
| 2 | 1 | 1. | Input X coordinate value |
| 3 | [2ndf] [x↔y] | 0. | Internally store X coordinate value |
| 4 | 2 | 2. | Input Y coordinate value |
| 5 | [→rθ] | 2.2360679977 | Transform rectangular coordinates into polar coordinates, and display calculation result value "r" |
| 6 | [2ndf] [x↔y] | 63.434948882 | Display calculation result value "θ" |
| 7 | [2ndf] [x↔y] | 2.2360679977 | Display calculation result value "r" |
| 8 | [2ndf] [→xy] | 63.38664648 | Execute polar coordinate transformation. No complete reverse transformaton is executed |

SCIENTIFIC CALCULATOR WITH COORDINATE TRANSFORMATION AND SINGLE LINE NUMERIC VALUE DISPLAY

BACKGROUND OF THE INVENTION

1. Field of the Invention

The present invention relates to a scientific calculator capable of function conversion operations, and more particularly to a scientific calculator capable of coordinate transformation.

2. Description of the Prior Art

Conventional scientific calculators capable of coordinate transformation (for example, a type provided with a one-line numerical value display unit capable of displaying only one numerical value or one calculation result value) can not display simultaneously coordinates composed of two numerical values. Therefore, it has been predetermined which of the coordinate calculation result values is to be first displayed after completing coordinate calculation. Thereafter, confirming the numerical value, the user operates a numerical value replacement key ([x←→y] key) for replacing the numerical value currently displayed by the numerical value display unit with the other numerical value stored in a data storage unit (RAM) of the calculator, thereby confirming alternately the two numerical values produced from the calculation.

An example of a transformation operation is from rectangular coordinates (x, y) to polar coordinates (r, $\theta$). This transformation requires the confirmation of the input order of the values "r" and "$\theta$" for executing a reverse transformation to go back co the rectangular coordinates following the display of the calculation result on the polar coordinates. In other words, when the value "r" is displayed immediately after a polar coordinate transformation operation, it has been conventionally required to display the value "$\theta$" at the display unit before executing the rectangular coordinates transformation.

Figure 7:
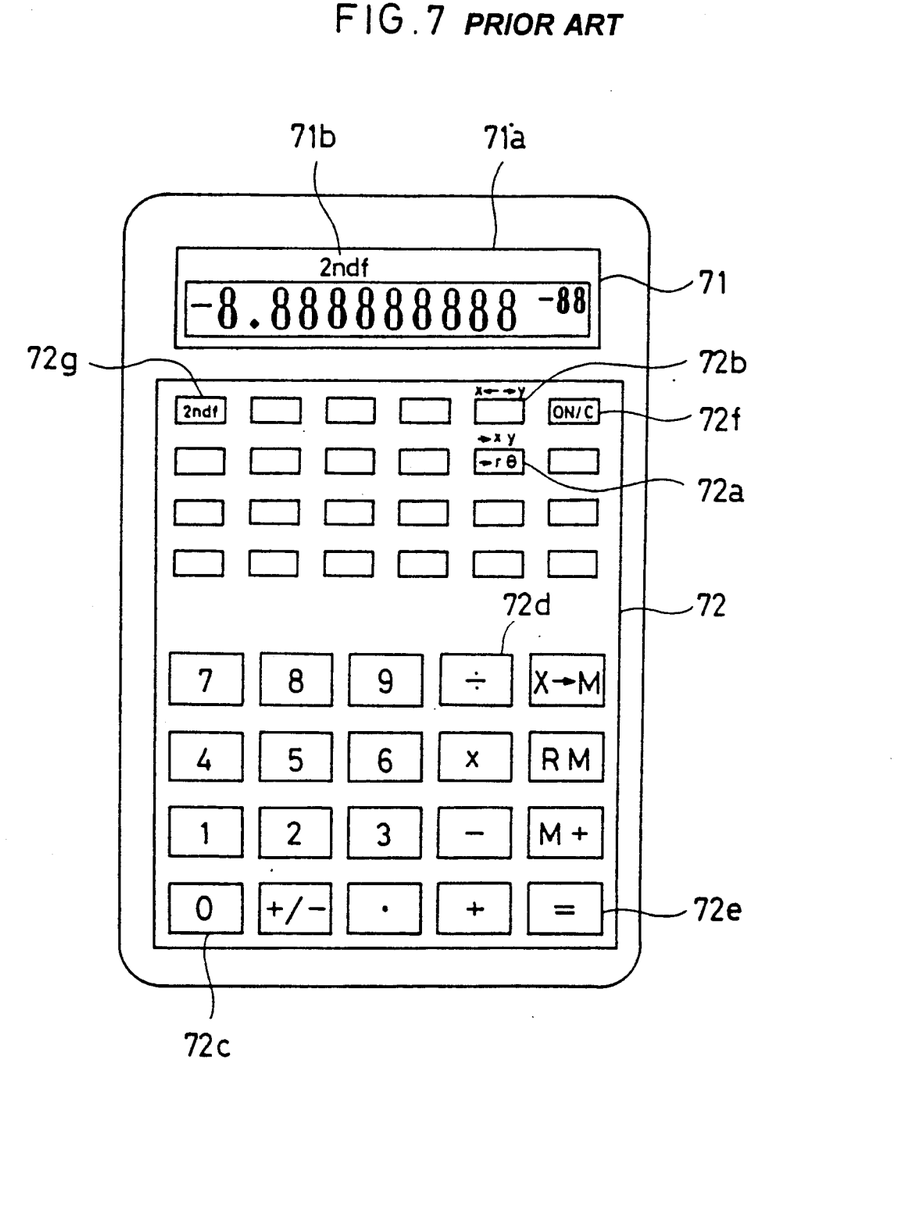
FIG. 7 is an exterior view of a conventional function calculator.

FIG. 7 is an exterior view of a conventional scientific calculator. Referring to FIG. 7, the reference numeral 71 denotes a display unit of the calculator. The display unit 71 includes a numerical value display unit 71a and a [2ndf] symbol display unit 71b for indicating a second function selection condition.

The reference numeral 72 denotes a key input unit. The reference numeral 72a denotes a coordinate transformation key for executing a first function of polar coordinate transformation calculation in a [→r$\theta$] key condition as well as a second function of rectangular coordinate transformation calculation in a [→xy] key condition.

The reference numeral 72b denotes a [x←→y] key (numerical value replacing key) for replacing the value displayed at the moment with the value stored inside the calculator, while the reference numeral 72c denotes an argument key for entering a numerical value. The reference numeral 72d represents four arithmetic calculation keys [+], [−], [×], and [÷], while the reference numeral 72e denotes an equal key [=] for executing calculation such as the four arithmetic calculations. The reference numeral 72f denotes an [ON/C] key for clearing the calculation result value or turning on the calculator powered off, while the reference numeral 72g is a [2ndf] key (2nd function key) for designating the second function.

Figure 8:
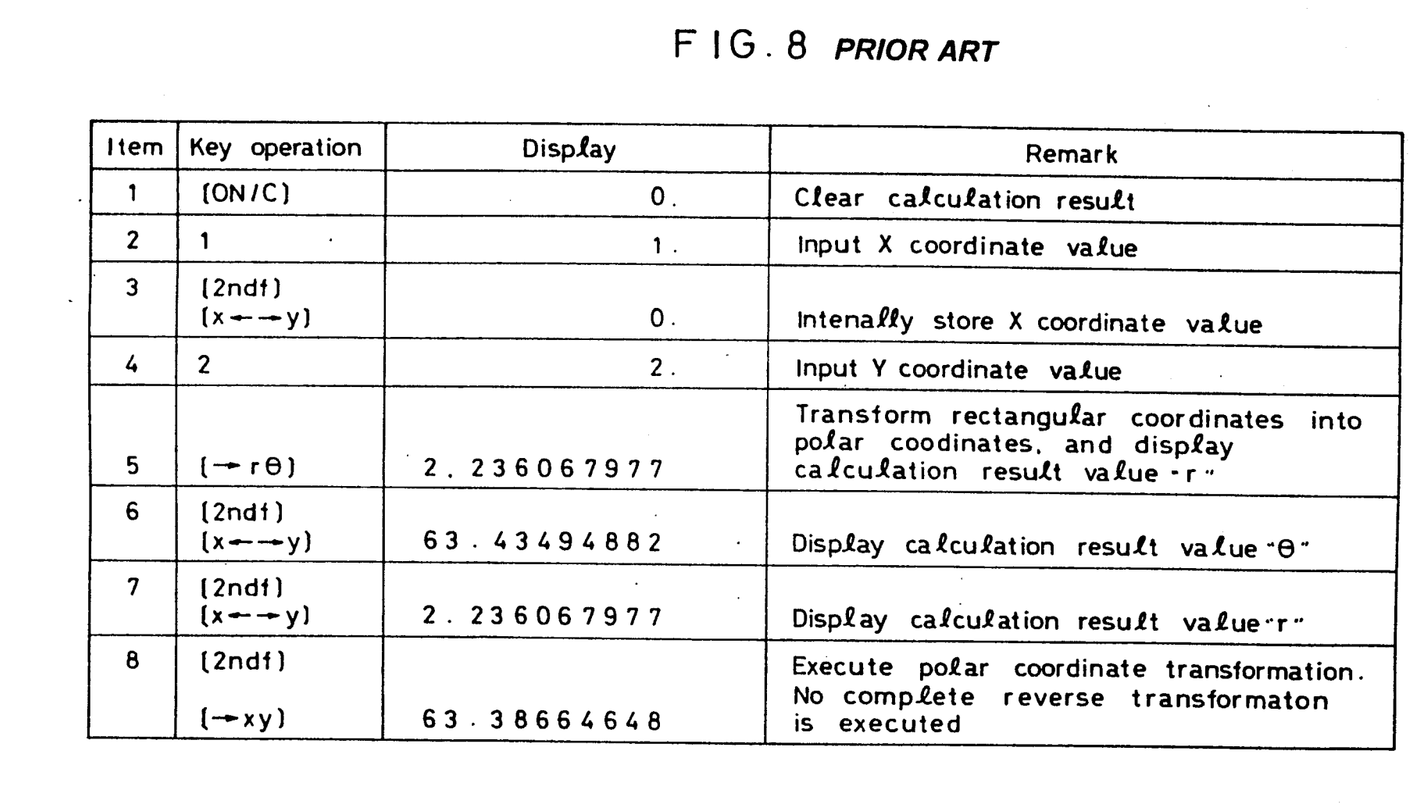
FIG. 8 is a chart showing a calculation example of coordinate transformation according to a conventional technique.

FIG. 8 is a chart showing a coordinate transformation calculation example according to a conventional technique.

The example shown in FIG. 8 is a calculation example for transforming rectangular coordinates (x=1, y=2) into polar coordinates (r, $\theta$) and shows the contents of processing with regard to each item.

Item 1: Data inside the calculator is cleared by operating the [ON/C] key.

Item 2: An X coordinate value "1" is entered.

Item 3: The numerical value currently displayed (X coordinate value) is replaced by the numerical value internally stored.

Item 4: A Y coordinate value "2" is entered.

Item 5: The rectangular coordinates (1, 2) are transformed into the polar coordinates (r, $\theta$). Between the calculation result values, the value r (2.236067977) is displayed.

Item 6: The numerical value currently displayed (value r) is replaced by the numerical value stored inside (value $\theta$), and then the value $\theta$ (63.43494882) is displayed.

Item 7: The value r (2.236067977) is displayed again.

Item 8: A reverse transformation is executed. However, since the value "r" is currently displayed, no complete reverse transformation for the transformation executed as above is executed. The reason of the above is that the value currently displayed is used as the value "$\theta$" in executing the calculation of [→xy], where the values "r" and "$\theta$" are exchanged. Consequently, a rectangular coordinate transformation is executed for the coordinates (63.43494882, 2.236067977).

For the above-mentioned reasons, display of only one numerical value has been permitted for two calculation result values in a scientific calculator based on the conventional technique, and therefore it has been unable to discriminate which of the numerical values is currently displayed. Furthermore, when executing a reverse transformation calculation for the transformation result executed just now, the transformation operation has been required to be executed always after displaying the value "$\theta$" (polar coordinate value) or the value "y" (rectangular coordinate value).

Therefore, the user is required to remember which of the calculation result values is currently displayed, which easily results in an error of designating an incorrect coordinate value in the reverse transformation calculation process immediately after the transformation calculation as described on Item 8 in FIG. 8.

As a means for resolving the above-mentioned drawbacks, there is proposed for a pocket computer a display method including a multi-line display unit comprised of a specified number of figures and a plurality of lines allowing many calculation equations to be displayed, thereby assuring easy confirmation of all the calculation equations and preventing the possible confusion between the calculation equations and calculation result values (JP 60-186928).

However, the above-mentioned display method is for a pocket computer having a multi-line display unit comprised of at least two lines. In other words, there is provided no disclosure of a display method for easily confirming which of two calculation result values is currently displayed when two calculation result values exist in a scientific calculator having a numerical value display unit capable of displaying a numerical value only in one line.

SUMMARY OF THE INVENTION

The present invention is made in view of the above facts, and accordingly it is an object of the present invention to provide a function calculator capable of reconfirming which of two calculation result values is currently displayed when two calculation result values exist in a scientific calculator having a numerical value display unit capable of displaying a numerical value only in one line as well as executing a reverse transformation calculation operation for the transformation calculation executed just now by adopting the scheme of discriminating the meaning of the numerical value currently displayed even when either of the calculation result values is currently displayed immediately after the transformation calculation.

The present invention is to provide a scientific (or function) calculator capable of function calculation requiring two calculation result values comprising:

input means for entering a numerical value and a functional formula as well as a command of numerical value or transforming a function;

calculation means for calculating two calculation result values based on the numerical value and the functional formula entered from the input means;

storage means for storing the numerical value entered from the input means and the calculation result values calculated by the calculation means;

numerical value display means for displaying one numerical value thus entered or one calculation result value thus calculated;

guidance display means for displaying a character and a symbol representing a calculation process and the meaning of the numerical value;

symbol display means for displaying two types of display symbols indicating that, upon display of one of two calculation result values at the numerical value display means, the other calculation result value is stored in the storage means; and retrieval means for retrieving, upon display of one of the two types of display symbols, the other numerical value or the calculation result value from the storage means in response to the command entered from the input means, thereby replacing the numerical value or the calculation result value thus retrieved from the storage means with the numerical value or the calculation result value displayed at the moment on the numerical value display means.

The above-mentioned retrieval means is preferably so constructed that it retrieves alternately the two numerical values or the two calculation result values from the storage means by referring to the type of the two display symbols in response to the command of numerical value replacement entered from the input means, thereby replacing the numerical value or the calculation result value thus retrieved from the storage means with the other numerical value or the other calculation result value displayed at the moment at the numerical value display means.

The above-mentioned retrieval means is preferably so constructed that it replaces one symbol with the other to be displayed at the symbol display means in replacing the numerical value or the calculation result value displayed at the moment at the numerical value display means with the other numerical value or the other calculation result value.

The above-mentioned calculation means is preferably so constructed that it executes a reverse function calculation for the calculation result value displayed at the numerical value display means and the calculation result value stored in the storage means from the two calculation result values by referring to the type of the symbol displayed at the symbol display means in response to a command of reverse transformation entered from the input means.

According to the present invention, a function calculator capable of displaying only one numerical value can accurately confirm alternately the two calculation result values by referring to the character/symbol displayed at the guidance display means and the display symbol displayed at the symbol display means in need of two calculation result values, and can further accurately execute a calculation for reverse transformation.

It is noted that function calculators having a calculation function requiring two calculation result values includes, for example, a function calculator having a coordinate calculation function for transformation between two coordinate systems of rectangular coordinates for determining x- and y-axes coordinates (x, y) and polar coordinates for determining the coordinates $(r, \theta)$ where r and $\theta$ represent a length and an angle respectively.

BRIEF DESCRIPTION OF THE DRAWINGS

An embodiment of the invention will now be described by way of example and with reference to the accompanying drawings, in which.

DESCRIPTION OF THE PREFERRED EMBODIMENTS

The present invention will be detailed by way of embodiment shown in the attached drawings. It is noted that the scope of the present invention is not limited to the following embodiment.

Figure 1:
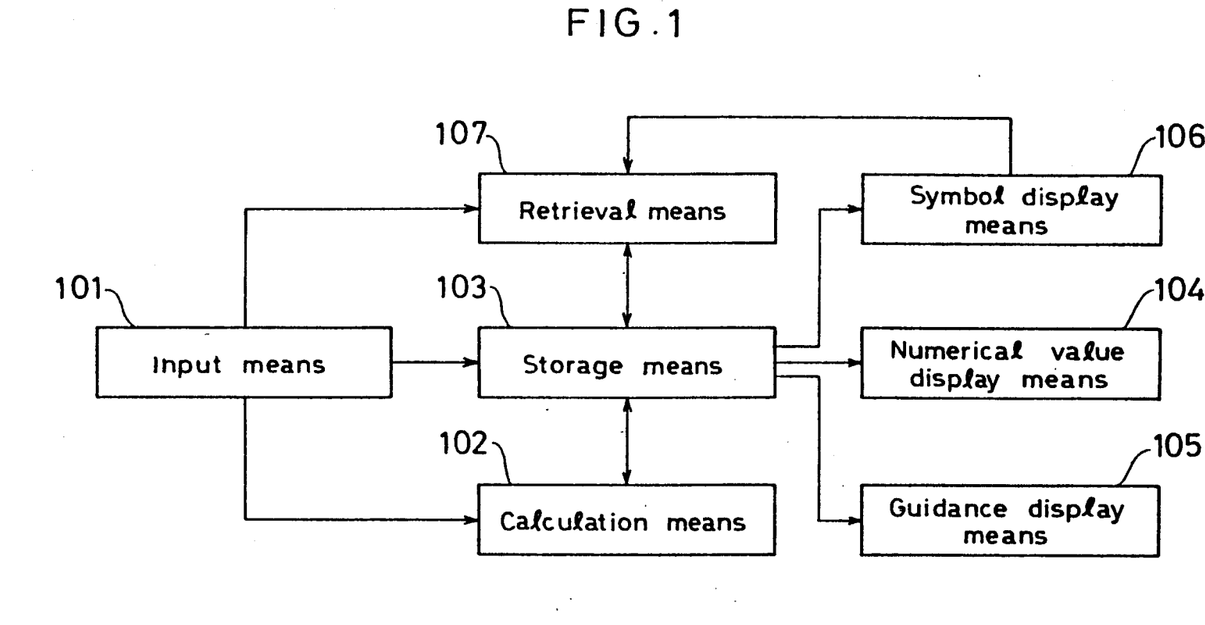
FIG. 1 is a block diagram showing the basic construction of the present invention.

FIG. 1 is a block diagram showing the basic construction of the present invention. Referring to FIG. 1, the present invention is comprised of input means 101, calculation means 102, storage means 103, numerical value display means 104, guidance display means 105, symbol display means 106, and retrieval means 107.

Figure 2:
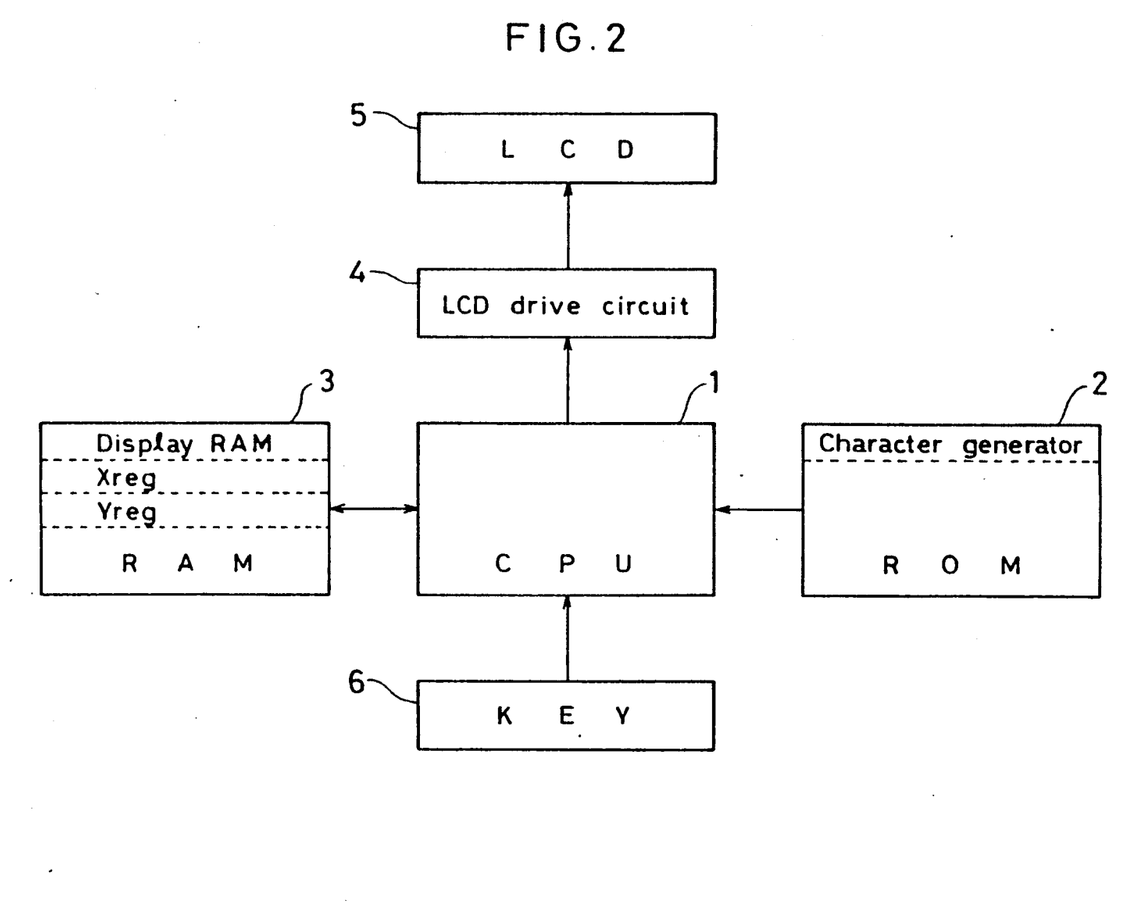
FIG. 2 is a block diagram of a scientific calculator in accordance with an embodiment of the present invention.

FIG. 2 is a block diagram of a scientific calculator in accordance with an embodiment of the present invention. Referring to FIG. 2, the reference numeral 1 denotes a CPU for controlling the calculator and concurrently serving as the calculation means 102 and the retrieval means 107. The reference numeral 2 denotes a ROM for storing a program for operating the calculator as well as constants and symbols. The reference numeral 3 denotes a RAM which is used as a memory for controlling the calculator and storing numerical values and serves as the storage means 103. The reference numeral 4 denotes an LCD (Liquid Crystal Display) drive circuit for driving and controlling an LCD. The reference numeral 5 denotes an LCD (Liquid Crystal Display) which serves as the numerical value display means 104, the guidance display means 105, and the symbol display means 106. The reference numeral 6 is a key (key matrix) which detects a key input and serves as the input means 101.

The ROM 2 includes a region for storing a program for operating the calculator and a character generator region for storing display patterns of characters, numerical values, and symbols. The RAM 3 includes a display RAM where one bit corresponds to one pixel (picture element) of the LCD 5, an X register for storing a numerical value to be displayed at a numerical value display unit 31a, and a Y register for internally storing a numerical value, and the like.

Figure 3:
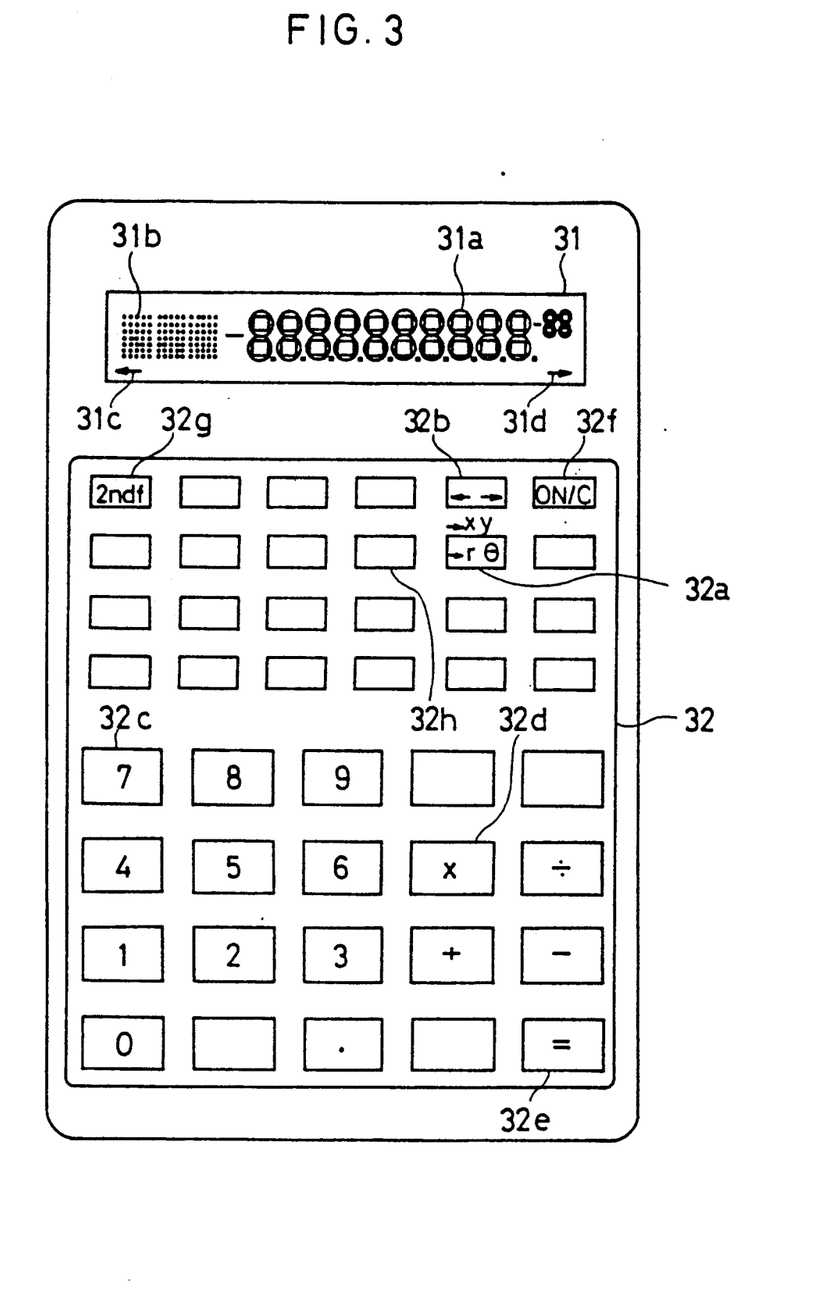
FIG. 3 is an exterior view of a scientific calculator in accordance with an embodiment of the present invention.

FIG. 3 is an exterior view of a scientific calculator in accordance with an embodiment of the present invention.

Referring to FIG. 3, the reference numeral 31 denotes a display unit of the calculator. The display unit 31 includes the numerical value display unit 31a (numerical value display means 104), a guidance display unit 31b comprised of 5×7 dots×3 figures dot matrix display for displaying a variety of guidance data (guidance display means 105), and a symbol display unit (symbol display means 106) for displaying an arrow symbol [←] 31c or an arrow symbol [→] 31d.

The reference numeral 32 denotes a key input section. 32 (input means 101). The reference numeral 32a denotes coordinate transformation keys [→rθ] and [→xy] for executing the first function of polar coordinate transformation calculation of [→rθ] and the second function of rectangular coordinate transformation of [→xy]. The reference numeral 32b denotes a numerical value replacing key [←——→] for alternately retrieving, when there are two calculation result values, the other calculation result value currently not displayed and displaying the same while the symbol [−] 31c or the symbol [→] 31d is lit. The reference numeral 32c denotes an argument key for entering a numerical value, the reference numeral 32d represents four arithmetic calculation keys [+], [−], [×], and [÷], and the reference numeral 32e denotes an equal key [=] for executing calculation such as the four arithmetic calculations.

The reference numeral 32f denotes an [ON/C] key for clearing a calculation result value or turning on the calculator powered off, and the reference numeral 32g is a [2ndf] key (2nd function key) for designating the second function. The reference numeral 32h denotes a [,] key for separating coordinates composed of two numerical values.

Figure 4A:
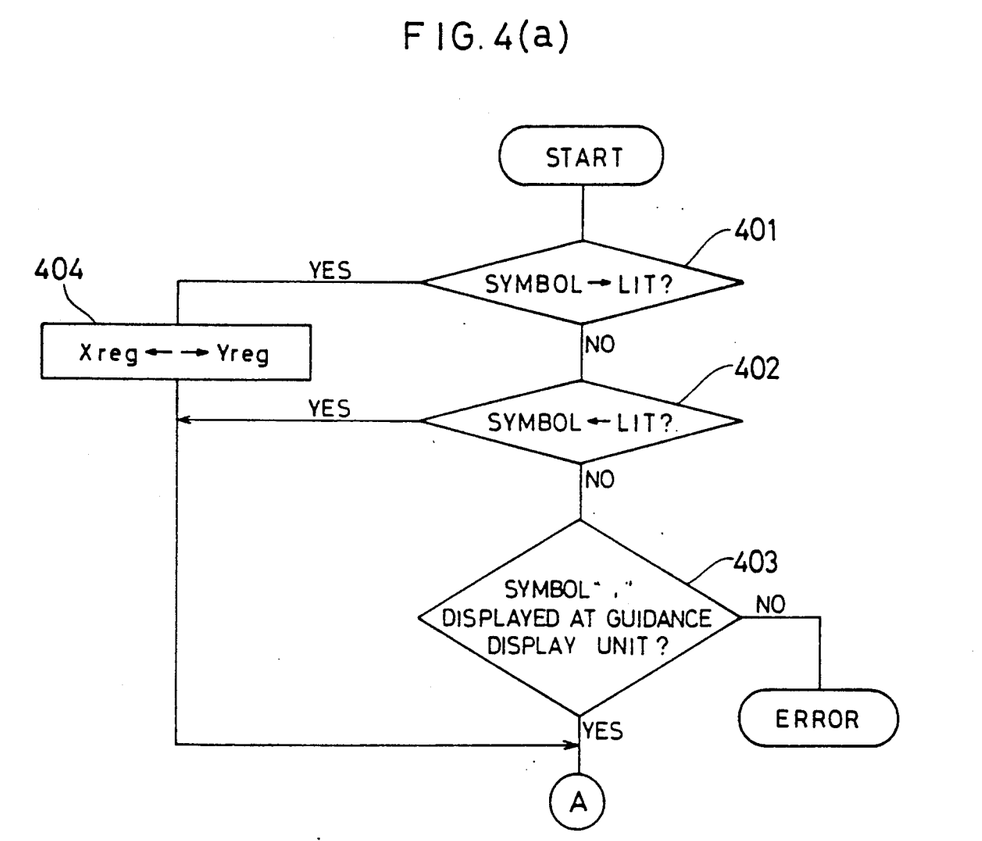
FIGS. 4(a) and 4(b) comprise a flowchart of the coordinate transformation operation by means of coordinate transformation keys of the present invention.
Figure 4B:
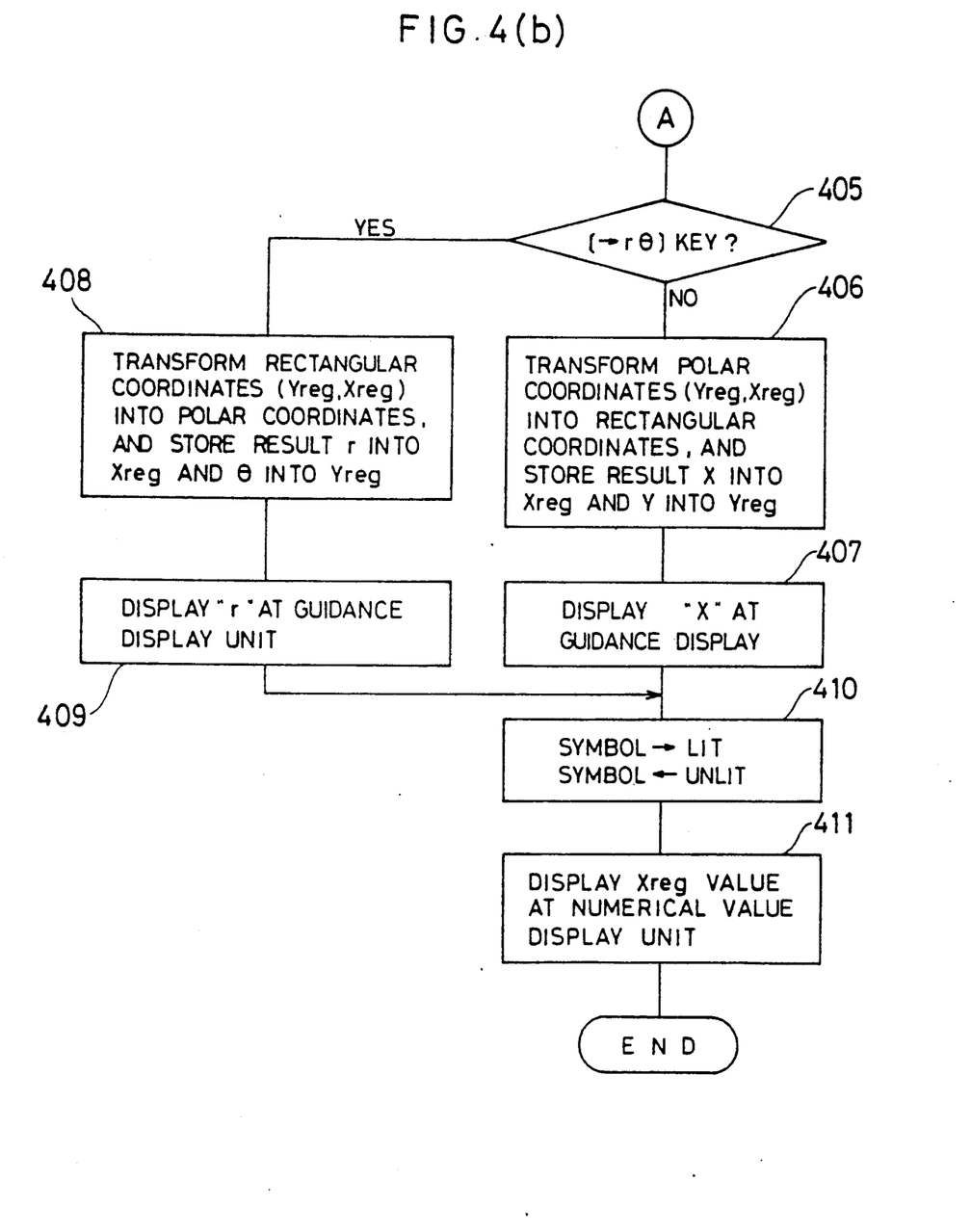
Figure 5A:
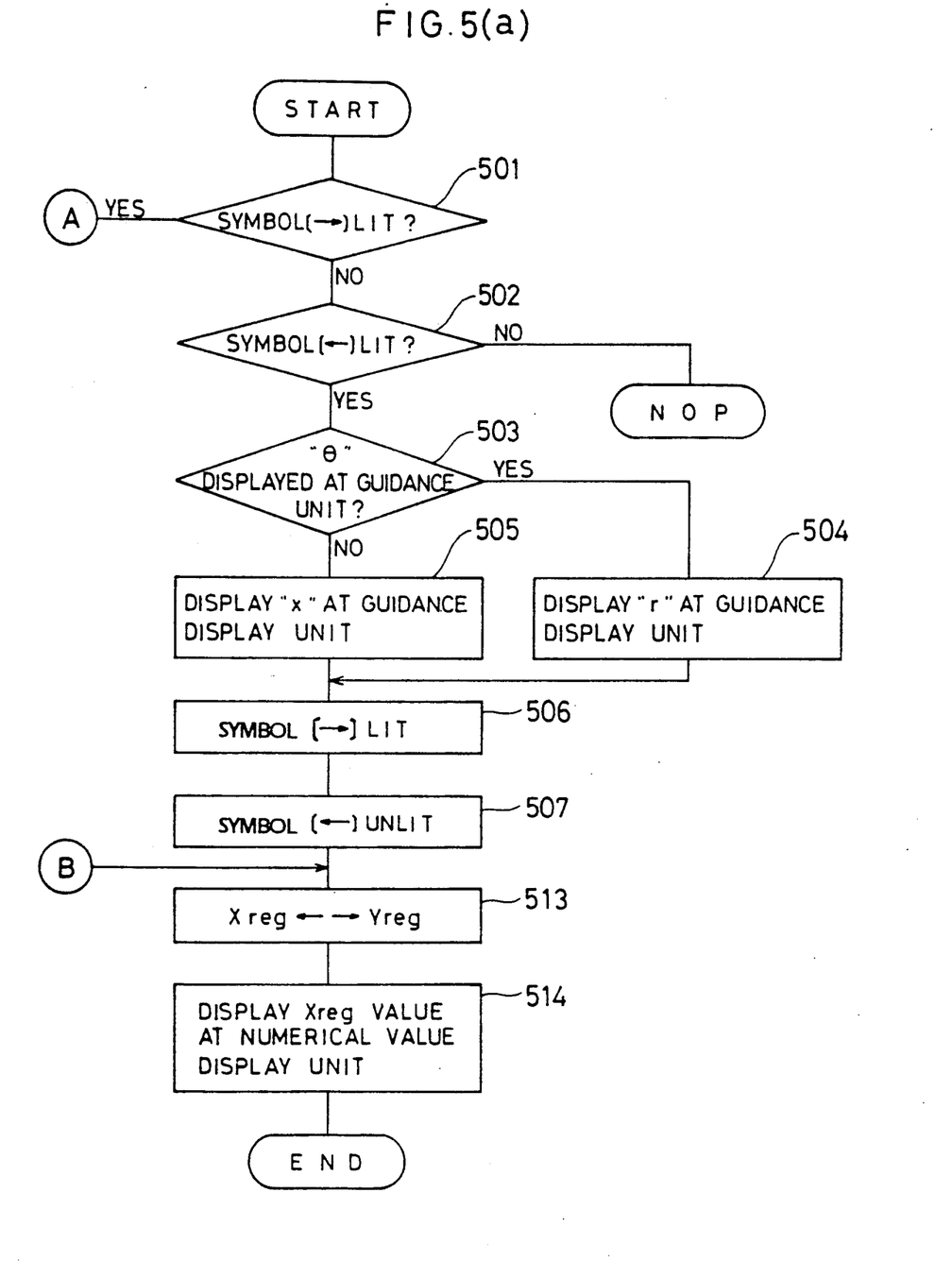
FIGS. 5(a) and 5(b) comprise a flowchart of the numerical value replacing operation by means of a numerical value replacing key of the present invention.
Figure 5B:
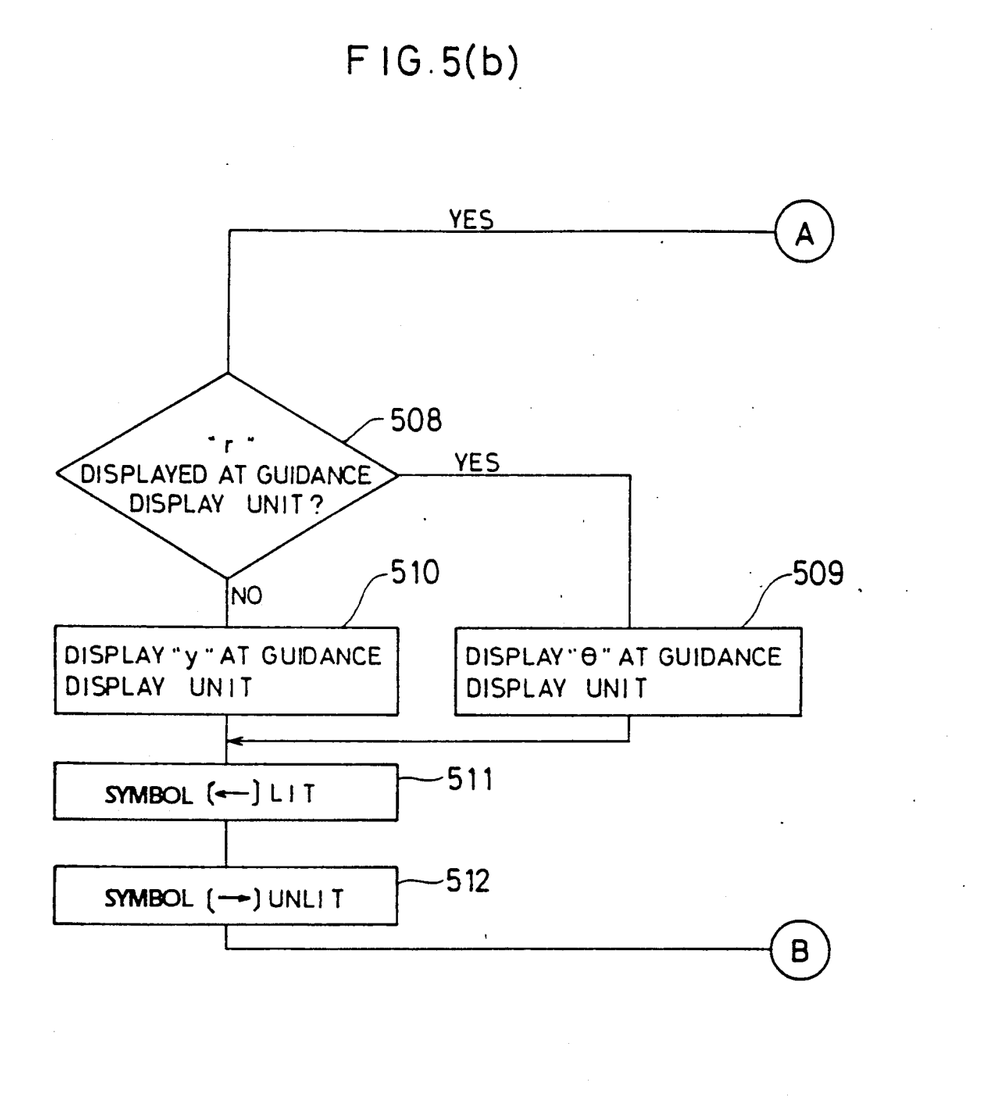

FIGS. 4 and 5 are flowcharts of operations by means of coordinate transformation and numeral change keys of the present invention. Now reference is made to a register shown in the flowcharts.

The register is secured in a region in the RAM 3 and it is capable of input and output in response to a command from the ROM 2.

The reference characters Xreg denote an X value register for storing in the RAM 3 the value to be displayed at the numerical value display unit 31a.

The reference characters Yreg denote a Y value register for storing the internal storage value in the RAM 3.

The expression of "displayed at the display unit" in the flowcharts means the operations of decoding a display character or a numerical value using a display pattern (character generator) stored in the ROM 2 as shown in the block diagram in FIG. 2 (one pixel on the display corresponds to one bit) and displaying the contents of the display RAM on the LCD 5 via the LCD drive circuit 4 by means of the CPU 1. Each of the arrow display symbols 31c and 31d corresponds to one bit of the display RAM. The contents of the display RAM is also capable of free input and output in the same manner as in the ordinary RAM.

FIGS. 4(a) and 4(b) comprise a flowchart of the coordinate transformation operation by means of the coordinate transformation keys of the present invention. The [→rθ] key and the [→xy] key are processed both based on the present flowchart, and it is detected which one of the keys was operated at Step 405 (see FIG. 4(b)) to execute the corresponding processing.

Step 401: It is detected whether a coordinate calculation result value is currently displayed according to the lighting conditions of the symbols. The symbol [→] indicates either the value "r" or "x".

Step 402: It is detected whether a coordinate calculation result value is currently displayed according to the lighting conditions of the symbols. The symbol [←] indicates either the value "θ" or "y".

Step 403: When neither the symbol [←] nor the symbol [→] is lit, the state indicates the condition where a transformation calculation is to be newly performed, not immediately after executing a coordinate transformation calculation. In a coordinate transformation operation, firstly two numerical values are necessary for transformation as input values, and therefore it is determined whether two input values are input according to the existence or absence of symbol "," displayed at the guidance display unit 31b. When the symbol "," is not displayed, it is determined that two inputs are not input to consequently produce the result of "error".

Step 404: When the symbol [→] is lit, the value "r" or "x" is stored in Xreg and the value "θ" or "y" is stored in the Yreg. Therefore, the value in the Xreg and the value in the Yreg are exchanged to provide the condition where the value "θ" or "y" is stored in the Xreg.

Step 405: The program flow can proceed to Step 408 when the [→rθ] key is pressed, or to Step 406 when the [→xy] key is pressed.

Step 406: A rectangular coordinate transformation operation is executed to store the result values into the Xreg and Yreg.

Step 407: A guidance display "x" corresponding to the value x stored in the Xreg is displayed at the guidance display unit 31b.

Step 408: A coordinate transformation operation is executed to store the two calculation result values into the Xreg and Yreg.

Step 409: A guidance display "r" corresponding to the value r stored in the Xreg is displayed at the guidance display unit 31b.

Step 410: The symbol [→] indicating the fact that the other calculation result value (solution) is located at right for convenience is lit, and the symbol [←] is unlit.

Step 411: The value in the Xreg is displayed at the numerical value display unit 31a.

FIGS. 5(a) and 5(b) comprise a flowchart of the numerical value replacing operation by means of a numerical value replacing key of the present invention.

The following describes the numerical value changeover processing operation with reference to FIGS. 5(a) and 5(b).

Step 501: It is detected whether a coordinate calculation value is displayed according to the lighting conditions of the display symbols 31c and 31d. The symbol [→] lights to indicate "r" or "x".

Step 502: it is detected whether the coordinate calculation value is currently displayed according to the lighting conditions of the symbols. The symbol [←] lights to indicate "θ" or "y". When neither the symbol [→] nor the symbol [←] is lit, no operation of the present flowchart is executed because now is not the time immediately after coordinate transformation calculation (NOP: NON OPERATION).

Step 503: It is determined whether the calculation result value displayed is the polar coordinate transformation result value or the rectangular coordinate transformation result value according to the contents of the guidance display unit 31b. As a consequence of the polar coordinate transformation, "θ" is displayed at the guidance display unit 31b.

Step 504: In the case of the polar coordinate transformation result, "r" is displayed at the guidance display unit 31b.

Step 505: In the case of the rectangular coordinate transformation result, "x" is displayed at the guidance display unit 31b.

Step 506: The symbol [→] for indicating the fact that the other solution is at right for convenience is lit.

Step 507: The symbol [←] is unlit.

Step 508: It is determined whether the calculation result value is the polar coordinate transformation result value or the rectangular coordinate transformation result value according to the contents of the guidance display unit 31b. As a consequence of the polar coordinate transformation, "r" is displayed at the guidance display unit 31b.

Step 509: In the case of the polar coordinate transformation result, "θ" is displayed at the guidance display unit 31b.

Step 510: In the case of the rectangular coordinate transformation result, "y" is displayed at the guidance display unit 31b.

Step 511: The symbol [←] indicating the fact that the other solution is at left for convenience is lit.

Step 512: The symbol [→] is unlit.

Step 513: The value in the Xreg and the value in the Yreg are exchanged. In more detail, the value "r" and the value "θ" are exchanged in the case of the polar coordinate transformation. The value "x" and the value "y" are exchanged in the case of the rectangular coordinate transformation.

Step 514: The value in the Xreg is displayed at the numerical value display unit 31a.

Figure 6:
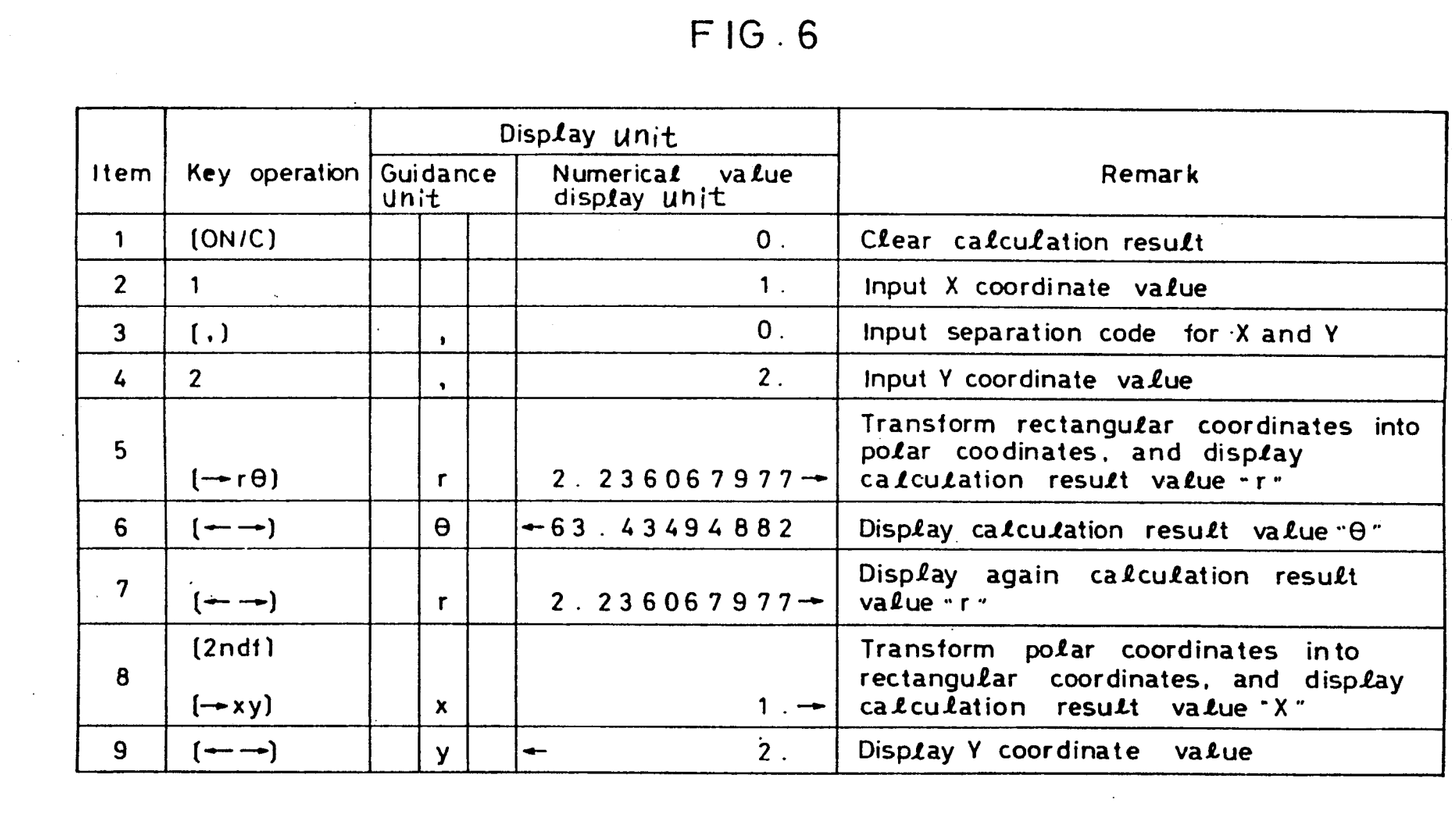
FIG. 6 is a chart showing a calculation example of coordinate transformation of the present invention.

FIG. 6 is a chart showing a calculation example of coordinate transformation of the present invention.

The example shown in FIG. 6 is a calculation example for transforming rectangular coordinates (x=1, y=2) into polar coordinates (r, θ), and shows the contents of the processing.

Item 1: Data inside the calculator is cleared by operating the [ON/C] key.

Item 2: The X coordinate value "1" is entered, and the value is stored in the Xreg.

Item 3: Coordinate separating code [,] is entered, and the value "1" input in Item 2 is stored in the Yreg.

Item 4: The Y coordinate value "2" is entered, and the value is stored in the Xreg.

Item 5: Polar coordinate transformation for the rectangular coordinates (1, 2) is executed, and the value "r" of the calculation result values is displayed. In the above case, the symbol [→] is lit to indicate the existence of the other calculation result value. In the flow chart shown in FIG. 4, an operation sequence flows in the order of Steps 401, 402, 403, 405, 408, 409, 410, and 411.

Item 6: The other calculation result value "θ" is displayed. In the above case, the symbol [←] is lit to indicate the existence of the other calculation result value. In the flow chart shown in FIG. 5, an operation sequence flows in the order of Steps 501, 508, 509, 511, 512, 513, and 514.

Item 7: The value "r" is displayed again. In the flow chart shown in FIG. 5, an operation sequence flows in the order of Steps 501, 502, 503, 504, 506, 507, 513, and 514.

Item 8: A reverse transformation is executed. Whether the value displayed at the moment is "r" or "θ", a reverse transformation calculation according to the guidance display is executed. In the flow chart shown in FIG. 4, an operation sequence flows in the order of Steps 401, 404, 405, 406, 407, 410, and 411.

Item 9: The other calculation result value "y" is displayed. In the above case, the symbol [←] is lit to indicate the existence of the other calculation result value. In the flow chart shown in FIG. 5, an operation sequence flows in the order of Steps 501, 508, 510, 511, 512, 513, and 514.

According to the present invention as described above, when two calculation result values are necessitated in a scientific calculator capable of displaying only one numerical value, two calculation result values can be confirmed alternately correctly and the reverse transformation calculation can be executed without fail.

What is claimed is:

1. A scientific calculator capable of performing a transformation calculation yielding two calculation result values, the calculator comprising:

an input device for entering at least two numerical values; a transformation command; and a replacement command;

a processor responsively connected to the input device for calculating two calculation result values based on the two entered numerical values and the entry of the transformation command;

a memory connected to the processor for storing, at least prior to entry of the transformation command, the numerical values entered from the input device and, subsequent to entry of the transformation command, the calculation result values calculated by the processor;

a numerical value display connected to the processor for displaying, at any one moment subsequent to entry of the transformation command, one of the calculation result values;

a guidance display connected to the processor for displaying an indicia which signifies a calculation process and a meaning of the numerical value displayed on the numerical value display;

a symbol display connected to the processor which, upon display of one of the two calculation result values at the numerical value display, provides an indication that the other calculation result value is stored in the memory; and wherein the processor, in response to entry of the replacement command, exchanges the calculation result value stored in the memory and the value displayed by the numerical value display.

2. The scientific calculator of claim 1 wherein the symbol display has two display elements, a first display element which is activated by the processor when a value displayed on the numerical value display subsequent to entry of the replacement command is a first coordinate of an ordered pair and a second display element which is activated by the processor when a value displayed on the numerical value display subsequent to entry of the replacement command is a second coordinate of the ordered pair.

3. The scientific calculator of claim 1 wherein the input device further has means for entering a reverse transformation command, and wherein the processor determines to which coordinate of an order pair the value displayed on the numerical display belongs by reference to the symbol display, and executes a reverse transformation calculation using the value displayed on the numerical value display and the other calculation result value.

4. The scientific calculator of claim 3 wherein the symbol display has two display elements, a first display element which is activated by the processor when a value displayed on the numerical value display subsequent to entry of the replacement command is a first coordinate of an ordered pair and a second display element which is activated by the processor when a value displayed on the numerical value display subsequent to entry of the replacement command is a second coordinate of the ordered pair.

* * * * *